United States Patent
Burke et al.

(10) Patent No.: US 6,622,178 B1
(45) Date of Patent: Sep. 16, 2003

(54) METHOD AND APPARATUS FOR ACTIVATING A COMPUTER SYSTEM IN RESPONSE TO A STIMULUS FROM A UNIVERSAL SERIAL BUS PERIPHERAL

(75) Inventors: Thomas C. Burke, Durham, NC (US); Eric R. Kern, Durham, NC (US); Richard A. Dayan, Wake Forest, NC (US); Daryl C. Cromer, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 09/611,788

(22) Filed: Jul. 7, 2000

(51) Int. Cl.$^7$ .................................................. G06F 3/00
(52) U.S. Cl. ......................... 710/15; 713/300; 710/109
(58) Field of Search ........................... 710/15, 18, 19, 710/63, 109, 220; 713/300, 323, 310, 324

(56) References Cited

U.S. PATENT DOCUMENTS

| | | | | |
|---|---|---|---|---|
| 5,247,655 A | * | 9/1993 | Khan et al. .................. 711/106 |
| 5,842,028 A | * | 11/1998 | Vajapey ....................... 713/310 |
| 6,105,142 A | * | 8/2000 | Goff et al. ................... 713/324 |
| 6,119,194 A | * | 9/2000 | Miranda et al. ............. 710/306 |
| 6,122,749 A | * | 9/2000 | Gulick ......................... 713/324 |
| 6,128,743 A | * | 10/2000 | Rothenbaum ............... 713/300 |
| 6,279,048 B1 | * | 8/2001 | Fadavi-Ardekani et al. .. 710/15 |
| 6,338,150 B1 | * | 1/2002 | Johnson et al. ............... 714/39 |
| 6,408,351 B1 | * | 6/2002 | Hamdi et al. ................. 710/63 |

* cited by examiner

*Primary Examiner*—Jeffrey Gaffin
*Assistant Examiner*—Niketa Patel
(74) *Attorney, Agent, or Firm*—Bracewell & Patterson LLP

(57) ABSTRACT

A method and apparatus for activating a computer system in response to a stimulus from a universal serial bus (USB) peripheral provides a mechanism for powering up a computer system or restoring it from a suspended mode of operation. The apparatus includes a controllable power supply and a non-standard protocol using the USB wire connections, to provide a method for polling the peripheral to determine if activity has occurred which a host computer system should use to trigger activation.

13 Claims, 4 Drawing Sheets

METHOD AND APPARATUS FOR ACTIVATING A COMPUTER SYSTEM IN RESPONSE TO A STIMULUS FROM A UNIVERSAL SERIAL BUS PERIPHERAL

BACKGROUND OF THE INVENTION

1. Technical Field

The present invention relates generally to computer systems, and more specifically to a computer system having a Universal Serial Bus (USB) interface. In particular, the present invention allows a computer system to be activated in response to activity generated at a USB peripheral.

2. Description of the Related Art

USB has been developed to provide a uniform electrical interface for personal computer systems peripherals. As a result, peripherals such as pointing devices, joysticks, modems, and Local Area Network (LAN) adapters equipped with a USB interface, have easier connection and lowered interface cost. Currently, up-to-date USB interfaces are developed in accordance with USB specification Revision 2.0 as promulgated by USB Implementers Forum, Inc., an Oregon non-profit corporation formed by a consortium of manufacturers of USB-related components.

USB uses a hub-based interconnect, that provides a star configuration interconnect in order to interface a potentially large number of peripherals to the main processing unit of a computer system. Hubs are used to provide an individual port for each peripheral or to provide a port for connection to another hub. Power and data signaling are incorporated within a single cable, making peripheral interfaces so convenient that wall adapters for low-power peripherals may be eliminated, and a single cable connection can be made.

Present-day computer systems provide power management to conserve power and reduce heat generated by a computer system when system activity is not required. A computer system may be set to a totally shutdown state, or may be placed in various modes known as "suspend" or "resume", among other terms of art used to describe an operating mode in which a portion of the computer system is active waiting on a stimulus to resume full system operation. Examples of stimuli that can be detected for resuming operations are mouse movement, modem dial-in, and LAN activity.

The USB specification provides a power management feature whereby a connected USB peripheral may wake up a host computer system using a resume signaling protocol. This power management feature may only be used while USB peripheral devices are placed in a suspended mode. Since the suspended mode must be initialized by the USB software components provided by the operating system, the USB peripheral device must be connected and the operating system must be executing on the host system prior to the use of the USB peripheral to wake up the system. Thus, the wake-up feature typically cannot be used with an uninitialized device that has not been connected to the host system prior to the host system entering the suspend state. Additionally, the resume signaling mechanism provides only a simple on/off signaling with no security provision for controlling power management access.

Therefore, it would be desirable to provide an improved method and apparatus for activating a computer system in response to a stimulus from a USB peripheral.

SUMMARY OF THE INVENTION

An interface for connecting a Universal Serial Bus (USB) peripheral to a computer system includes a USB physical layer interface and a wake-up controller coupled to the USB physical layer interface. The wake-up controller includes a secondary serial interface for polling the USB peripheral so that a wake-up stimulus may be detected. The interface also includes a controllable power supply for providing power to the USB peripheral during the polling operation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF AN ILLUSTRATIVE EMBODIMENT

Figure 1:
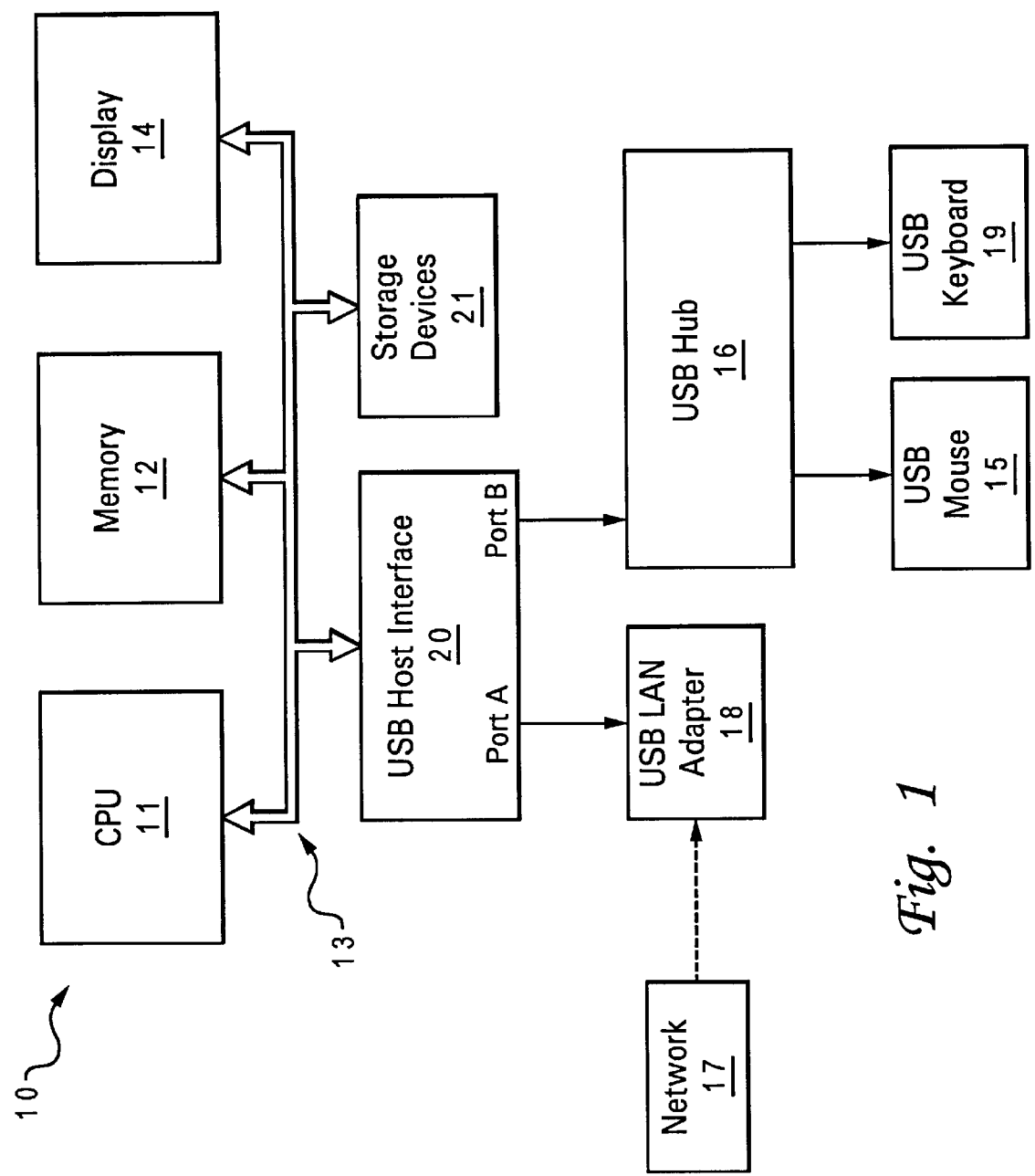
FIG. 1 is a block diagram of a computer system having a USB interface, in accordance with a preferred embodiment of the present invention.

With reference now to the figures, and in particular with reference to FIG. 1, there is depicted a block diagram of a computer system 10 having a USB host interface 20, in accordance with a preferred embodiment of the present invention. A Central Processing Unit (CPU) 11 is coupled via a bus 13 to a memory 12 for storing program data and instructions, a display 14 for display of graphical output, and storage devices 21 for file storage. Operation of computer system 10 is provided by an operating system such as AIX (manufactured by IBM Corporation) executing from memory 12 by CPU 11. The operating system provides power management states for conserving power by controlling computer system 10 to shut down various components.

A USB host interface 20 is also coupled to bus 13 and provides connectivity for USB LAN adapter 18 and a USB Hub 16. A USB mouse 15 is coupled to USB hub 16 to provide a connection to network 17 and a USB keyboard 19 is coupled to USB hub 16 to provide user input. It is desirable that USB peripherals USB mouse 15, USB keyboard 19, USB LAN Adapter 19 are able to restore computer system 10 from a power-saving state such as suspend or power-down states, without requiring that USB host interface 20 be in a fully operational state. In order to accomplish this, USB host interface 20 provides an improvement over a typical USB interface to allow polling of improved USB peripherals without requiring that the improved USB peripherals be continuously powered, nor requiring that the standard portions of USB host interface 20 or that of the USB peripherals be in a fully operational state.

In order to accomplish this, a non-USB serial communications protocol is used between the improved USB peripherals of the present invention and USB host interface 20 of the present invention. This secondary protocol provides the capability to communicate with the peripheral without requiring that host interface 20 be powered and operational or that the USB peripherals be initialized in accordance with the USB protocol. Upon application of power, a standard USB peripheral enters the "powered" state, wherein no communications are possible until a USB reset signal is sent. A USB reset is produced by driving both the data and complement data signals of the USB interface to a low logic level for at least 50 milliseconds. This will initialize the USB peripheral to the "default" state, from which the USB interface on the peripheral can accept commands and respond. As long as the secondary serial protocol does not generate a USB reset command, the USB interface will remain in the "powered" state until the reset command is received from USB host interface 20.

Commands that may be implemented in the secondary serial protocol include: 1) queries to determine whether a wake-up stimulus has been received by the USB peripheral, and 2) queries to determine the class and device descriptors and other information that may also be used by the USB interface. By providing the capability to read the device information that USB also provides, the secondary serial interface can identify the type and capabilities of the peripheral without requiring the USB interface come up to a full operational state.

Figure 2:
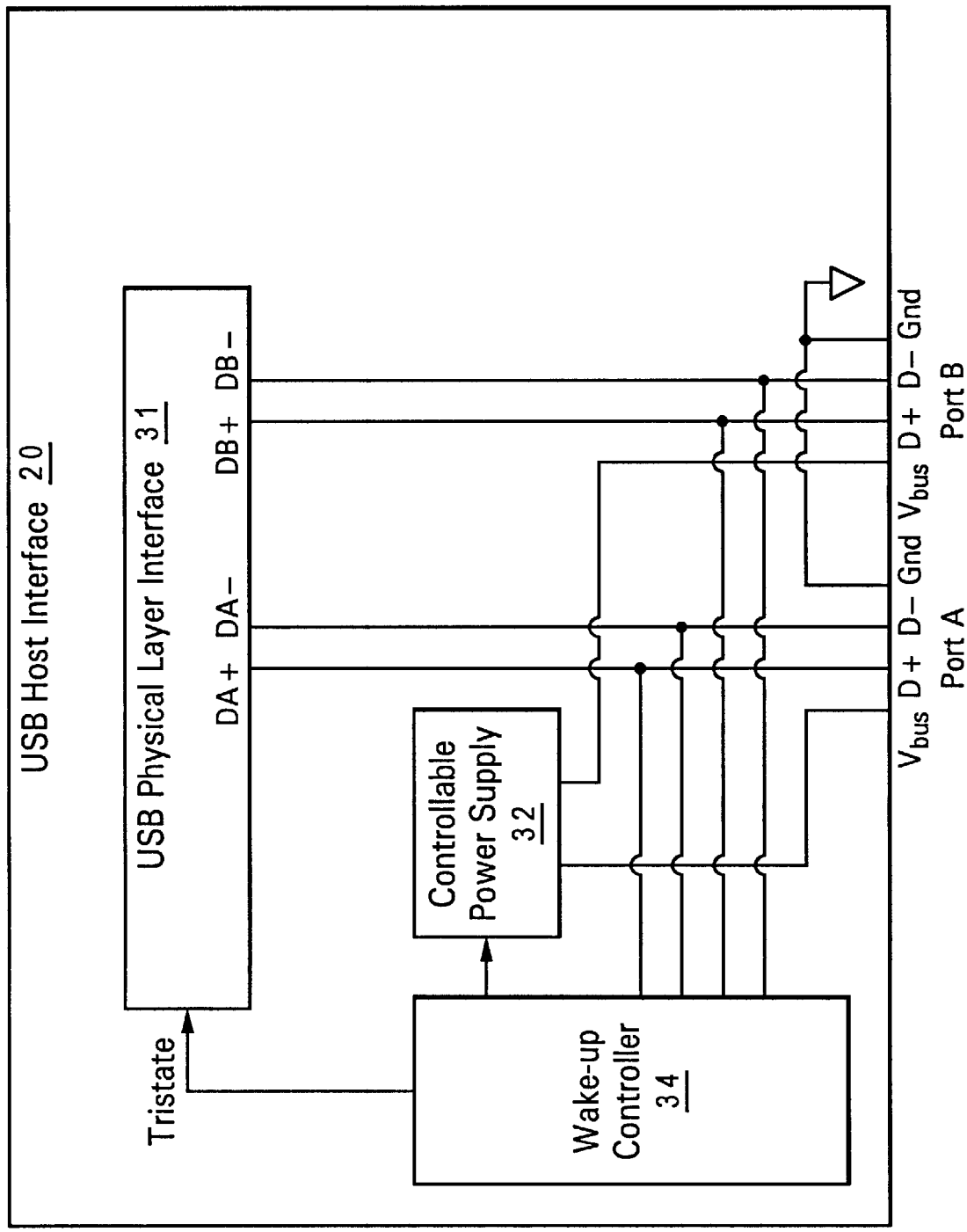
FIG. 2 is a block diagram of an interface for connecting a USB peripheral, in accordance with a preferred embodiment of the present invention.

Referring now to FIG. 2, a USB host interface 20 in accordance with a preferred embodiment of the invention is depicted. A USB physical layer interface 31 provides the USB standard portion of USB host interface 20, including USB physical layer support in accordance with the USB specification. A tristate control signal 36 is sent from a wake-up controller 34 to USB physical layer interface 31, in order to disable its outputs. This allows the connections to port a and port b that are provided from a wake-up controller 34 to control the levels at D+ and D− of port a and port b. Wake-up controller 34 is generally a microcontroller such as those presently available containing a standard logic level serial interface or an Inter-Integrated Circuit (I2C) interface, but may be a microcontroller without a serial interface using direct bit manipulation on the signal lines. Alternatively, a custom integrated circuit may be used to perform the USB wake-up functions. The transmit signal may be coupled to one of the port signal lines D+ or D− and the receive signal may be coupled to the other. This allows bidirectional communication without a handshaking requirement. The signals may alternatively be connected to a differential transmitter and receiver as in an RS-485 interface or the USB standard interface. This serial connection allows wake-up controller 34 to receive a wake up transmission from port a or port b.

Security may be implemented in wake-up controller 34, so that a connected peripheral may only be able to activate the computer system if a key or password is known and transmitted from the peripheral. A peripheral may also be used in this manner to allow administrative maintenance of network user workstations. A special USB LAN adapter may be programmed to accept remote wake up stimulus and installed at a user workstation, allowing a network administrator to power-up a remote computer without requiring pre-configuration of a USB device, unlike that required by a USB configuration using the standard remote wake-up capabilities of the USB specification.

Wake-up controller 34 controls a controllable power supply 32 to provide intermittent power to port a and port b. Controllable power supply 32 as configured must meet the USB power requirements for support of standard USB devices. As an alternative the controllable power supply may be a standby device connected in parallel with a USB power supply that is not powered during the power down or resume state. In this configuration, controllable power supply 32 does not have to supply the full current requirement of the USB interface, but only as much power as needed by the electronics in the connected peripheral that support wake-up communications with wake-up controller 34.

Figure 3:
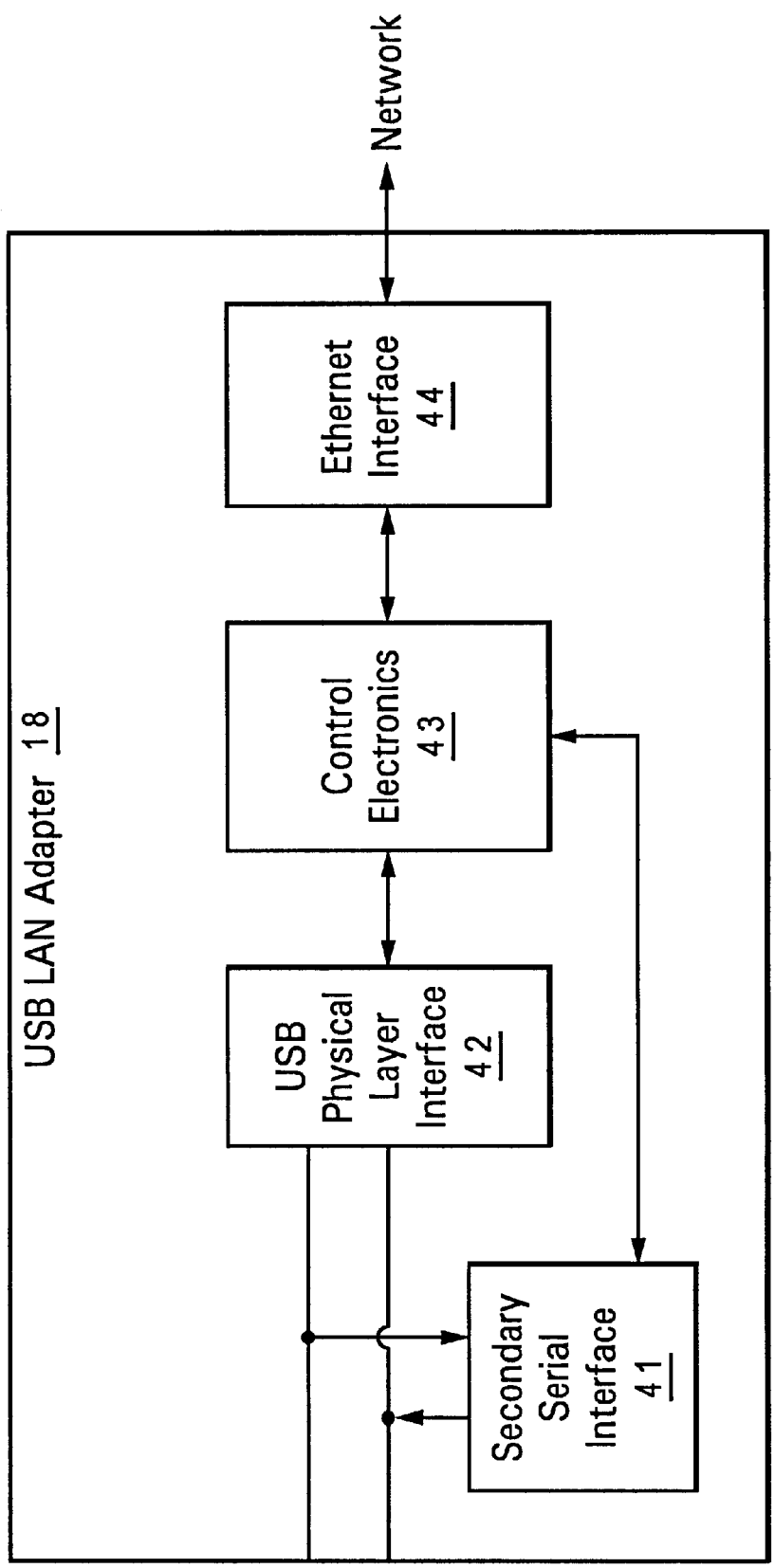
FIG. 3 is a block diagram of a USB peripheral, in accordance with a preferred embodiment of the present invention.

Referring now to FIG. 3, a USB LAN adapter 18 in accordance with a preferred embodiment of the present invention is depicted. A secondary serial interface 41 provides a means for transmitting and receiving the non-USB wake up protocol signals of the present invention. A USB physical layer interface 42, provides signaling according to the USB protocol. Control electronics 43 provides data conversion and control from an ethernet interface 44 which can be coupled to network connection 46, allowing USB network connection through USB physical layer interface 42 or Wake-on-LAN capability through secondary serial interface 41. A special packet can be sent from a network to network connection 46, to cause secondary serial interface to transmit a signal to a wake-up controller 34 in a connected host interface 20. Wake-up controller 34 may then wake up host computer system 10.

Figure 4:
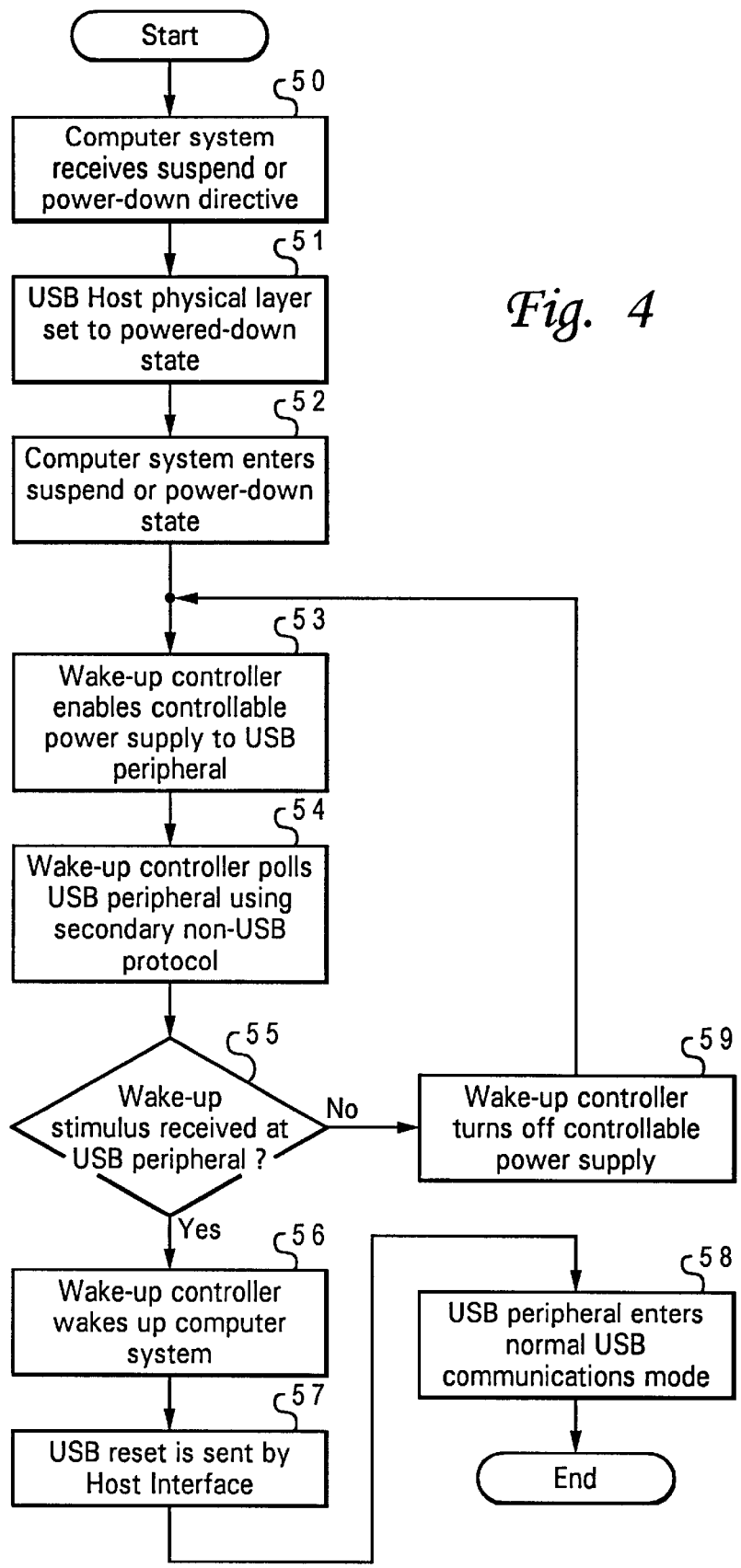
FIG. 4 is a flow diagram of a method of activating a computer system in response to a stimulus from a USB peripheral, in accordance with a preferred embodiment of the present invention.

Referring now to FIG. 4, a method for activating a computer system in response to a stimulus from a USB peripheral, in accordance with a preferred embodiment of the invention, is depicted. Computer system 10 receives a suspend or power-down directive (step 50) and the USB host physical layer interface 31 is set to the powered-down state (step 51). Computer system 10 then enters the suspend or power-down state (step 52). Periodically, the wake-up controller enables controllable power supply 32 to provide power to a USB peripheral connected to port a or port b (step 53). The wake-up controller then polls the USB peripheral using a secondary non-USB protocol (step 54). If a wake up stimulus has been received by the peripheral (decision 55), for example a Wake-on-LAN transmission received by a USB LAN adapter or user input received by a mouse or keyboard, wake-up controller 31 wakes up computer system 10 (step 56). A USB reset is then sent from USB host interface 20 to the peripheral (step 57) and the USB peripheral enters normal USB communications mode (step 58). If the polling step (step 54) does not indicate that a wake-up stimulus was received at the USB peripheral (step 55), then wake-up controller 31 turns off controllable power supply 32 (step 59) until the next polling iteration (step 53).

Although the invention has been described with reference to specific embodiments, this description is not meant to be construed in a limiting sense. Various modifications of the disclosed embodiments, as well as s alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A Universal Serial Bus (USB) interface capable of activating a computer system from a suspend state in response to a wake-up stimulus from a USB peripheral coupled to said computer system via said USB interface, said USB interface comprising:

a USB physical layer interface for sending commands to and receiving responses from said USB peripheral;

a controllable power supply for periodically providing power to said USB peripheral; and a wake-up controller, coupled to said USB physical layer interface and said controllable power supply, for controlling said controllable power supply to periodically supply power to said USB peripheral and for polling said USB peripheral to determine if a wake-up stimulus has been received by said USB peripheral during one of said periods in which power is applied to said USB peripheral.

2. The computer system of claim 1, wherein said USB peripheral is a local-area network (LAN) adapter, and said wake-up stimulus is a wake-on-LAN stimulus.

3. The computer system of claim 1, wherein said wake-up controller includes an Inter-Integrated Circuit (I$^2$C) interface for polling said USB peripheral.

4. The computer system of claim 1, wherein said USB physical layer interface includes a data signal line for sending commands to said USB peripheral and a complementary data signal line for receiving responses from said USB peripheral.

5. The computer system of claim 1, wherein said USB peripheral has a first mode of operation and a second mode of operation, wherein said USB peripheral uses a non-USB protocol to communicate with said wake-up controller of said USB interface during said first mode of operation, wherein said USB peripheral uses a USB protocol to communicate with said USB physical layer interface of said USB interface during said second mode of communication, wherein said USB peripheral remains in said first mode of operation until a USB reset command is received.

6. The computer system of claim 5, wherein said non-USB protocol includes commands for retrieving wake-up stimulus information.

7. The computer system of claim 5, wherein said non-USB protocol includes commands for retrieving device class information.

8. A method for activating a computer system from a suspend state in response to a wake-up stimulus from a Universal Serial Bus (USB) peripheral coupled to said computer system, said method comprising:

periodically applying power to said USB peripheral while said computer system is in said suspended state;

during one of said periods in which power is applied to said USB peripheral, determining whether or not a wake-up stimulus has been received by said USB peripheral by sending commands to said USB peripheral using a non-USB protocol; and in response to a determination that a wake-up stimulus has been received by said USB peripheral, restoring said computer system from said suspended state to a full operational state.

9. The method of claim 8, wherein said method further includes in response to a determination that a wake-up stimulus has not been received by said USB peripheral, turning off power to said USB peripheral until another one of said periods in which power is applied to said USB peripheral.

10. The method of claim 8, wherein said determining further includes:

sending commands to said USB peripheral using said non-USB serial protocol over a data signal line, and receiving responses to said command from said USB peripheral in said non-USB serial protocol over a complementary data signal line.

11. The method of claim 8, wherein said determining further includes:

sending commands to said USB peripheral using said non-USB serial protocol in complementary states over a data signal line and a complementary data signal; and receiving responses to said commands from said USB peripheral in said non-USB serial protocol in complementary states over said data signal line and said complementary data signal line.

12. The method of claim 8, wherein said restoring further includes placing a USB physical layer interface within said USB peripheral in an operating state by sending a USB reset command to said USB peripheral.

13. The method of claim 8, wherein said method further includes polling said USB peripheral for device class-information using said non-USB serial protocol.

* * * * *